UNITED STATES PATENT OFFICE.

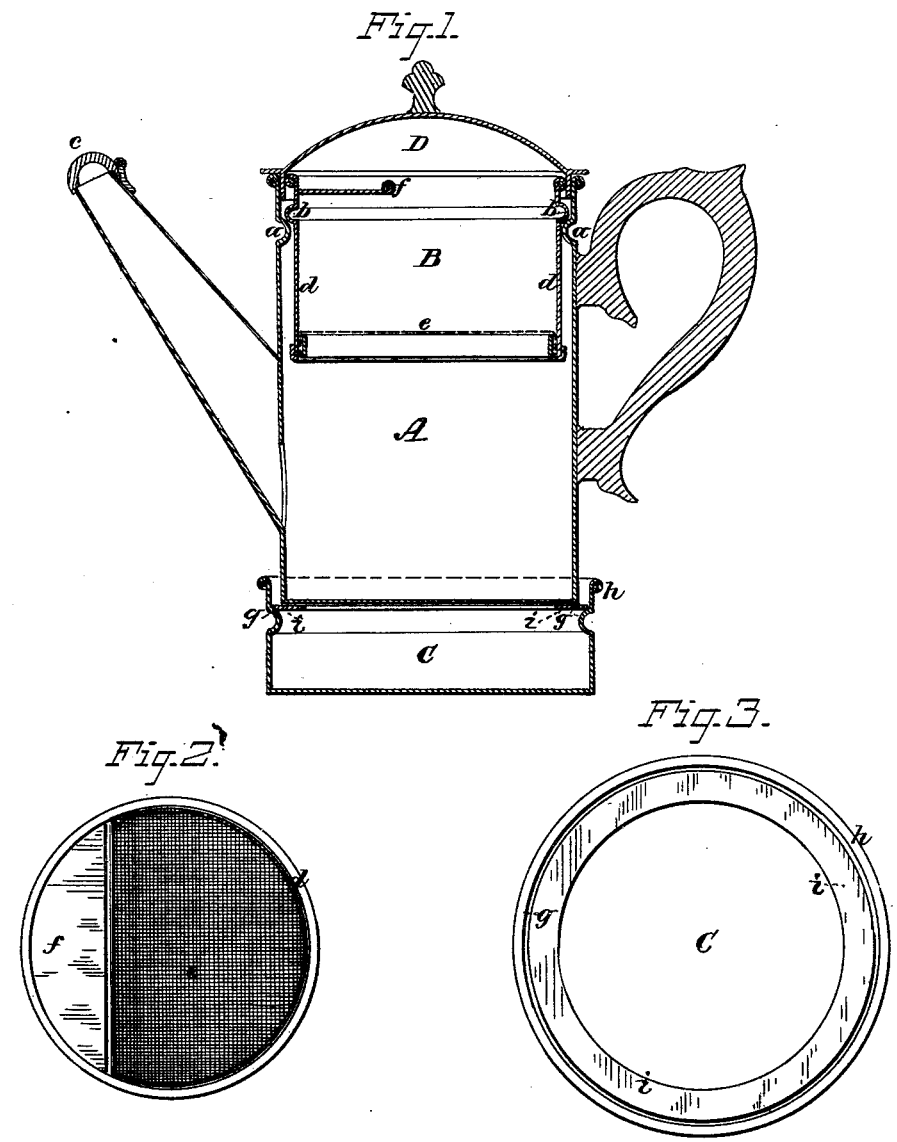

HENRY C. RICE, OF LOUISIANA, MISSOURI.

COFFEE-POT.

SPECIFICATION forming part of Letters Patent No. 229,640, dated July 6, 1880.

Application filed March 2, 1880. (Model.)

*To all whom it may concern:*

Be it known that I, HENRY C. RICE, a citizen of the United States, residing at Louisiana, in the county of Pike and State of Missouri, have invented certain new and useful Improvements in Coffee-Pots, of which the following is a specification.

My invention relates chiefly to what are known as percolating coffee-pots, in which the ground coffee is placed in a filtering-receptacle at the upper part of the pot and hot water is poured upon and allowed to percolate through it; and to prevent ebullition of the beverage while over the fire, and to keep it hot after its removal therefrom, the pot is provided with a water-vessel, in or on which it sits, all as will be more fully hereinafter set forth.

In the drawings which serve to illustrate my invention, Figure 1 is a vertical mid-section of my coffee-pot with the parts shown in position for use. Fig. 2 is a plan of the filter, and Fig. 3 is a plan of the water-vessel.

Let A designate a coffee-pot proper, B the filter, and C the water-vessel.

The pot A is or may be of the usual construction, but is provided with an internal bead, ledge, or shoulder, $a$, just below its top for the support of the filter B, which latter is adapted to fit within the pot, and is provided with an external bead or ledge, $b$, arranged to rest upon the bead or ledge $a$ when inserted.

The top of the filter and the top of the pot are on a level, and the flange of the cover D fits into the annular interstice between them, so as to hold the filter down to its seat on the bead $a$.

The filter B is preferably made of sheet metal, and its wall $d$ is preferably unperforated. The bottom is covered with gauze, muslin, or other filtering material, $e$, in the usual way, and it may be provided with a dam or guard, $f$, to prevent the grounds from escaping in pouring.

The water-vessel C forms a base or stand for the pot, and is provided with an internal bead or ledge, $g$, to support the pot, the rim $h$ of the vessel rising on all sides to form an encircling-guard.

Upon the bead $g$ is placed a ring or washer, $i$, which is readily removable. This washer serves to provide a broader support for the pot than the ledge $g$, and to permit, if desired, pots of two sizes to be employed, and its ready removability permits the vessel C to be readily cleaned.

The hot water in the vessel C will serve to keep the coffee in the pot warm for a long time after its removal from the fire.

Having thus described my invention, I claim—

1. A coffee-pot provided with a bead, $a$, below the top, a filter, B, provided with a bead, $b$, below its top, the tops of the filter and pot being substantially on the same level when the bead $b$ rests on the bead $a$, and a cover, D, whose flange fits into the annular interstice between the filter and pot proper, substantially as shown.

2. The combination of the pot A, the water-vessel C, provided with the internal bead, $g$, and rim $h$, and the loose removable ring or washer $i$, all arranged substantially as set forth.

In witness whereof I have hereunto signed my name in the presence of two subscribing witnesses.

HENRY C. RICE.

Witnesses:
D. A. BALL,
WM. LANSDOWN.